(12) United States Patent
Kato et al.

(10) Patent No.: US 7,643,197 B2
(45) Date of Patent: Jan. 5, 2010

(54) METHOD OF MANUFACTURING OSCILLATOR DEVICE, AND OPTICAL DEFLECTOR AND OPTICAL INSTRUMENT HAVING OSCILLATOR DEVICE

(75) Inventors: Takahisa Kato, Tokyo (JP); Kazutoshi Torashima, Palo Alto, CA (US); Takahiro Akiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/267,803

(22) Filed: Nov. 10, 2008

(65) Prior Publication Data
US 2009/0135472 A1 May 28, 2009

(30) Foreign Application Priority Data
Nov. 21, 2007 (JP) .............................. 2007-301251

(51) Int. Cl.
*G02B 26/08* (2006.01)
(52) U.S. Cl. ...................... 359/224.1; 359/900; 438/113
(58) Field of Classification Search ........................ None
See application file for complete search history.

(56) References Cited

U.S. PATENT DOCUMENTS

| 6,270,224 | B1 | 8/2001 | Sunaga et al. |
| 6,278,553 | B1 | 8/2001 | Akiyama |
| 6,327,087 | B1 | 12/2001 | Hashimoto et al. |
| 6,335,837 | B1 | 1/2002 | Aratani et al. |
| 6,900,925 | B2 | 5/2005 | Kato et al. |
| 7,038,834 | B2 | 5/2006 | Kato et al. |
| 7,220,009 | B2 | 5/2007 | Shimada et al. |
| 7,310,176 | B2 | 12/2007 | Kato et al. |
| 7,355,774 | B2 | 4/2008 | Kato et al. |
| 7,423,795 | B2 | 9/2008 | Kato et al. |
| 7,446,920 | B2 | 11/2008 | Kato et al. |
| 2005/0141070 | A1 | 6/2005 | Orcutt et al. |
| 2005/0185240 | A1* | 8/2005 | Kato et al. ................... 359/224 |
| 2007/0144867 | A1 | 6/2007 | Torashima et al. |
| 2007/0279720 | A1 | 12/2007 | Torashima et al. |
| 2008/0266632 | A1 | 10/2008 | Kato et al. |

FOREIGN PATENT DOCUMENTS

| JP | 5-27193 | 2/1993 |
| JP | 7-58345 | 3/1995 |

\* cited by examiner

*Primary Examiner*—James Phan
(74) *Attorney, Agent, or Firm*—Fitzpatrick, Cella, Harper & Scinto

(57) ABSTRACT

A method of manufacturing an oscillator based on etching a monocrystal silicon substrate, the method including a mask forming step for forming, on the monocrystal silicon substrate, an etching mask having a pattern with a repetition shape comprised of a plurality of mutually coupled oscillators each including a torsion spring between a supporting base plate and a movable member, an etching step for etching the monocrystal silicon substrate while using the etching mask as a mask, to form on the monocrystal silicon substrate a repetition shape comprised of a plurality of corresponding mutually coupled oscillators, and a dicing step for determining a width of the movable member and the supporting base plate of each of the oscillators in the repetition shape, which width is effective to determine a resonance frequency of the individual oscillators required when these are used as oscillators, and for cutting by dicing the movable member and the supporting base plate between adjoining oscillators, at the determined width.

7 Claims, 14 Drawing Sheets

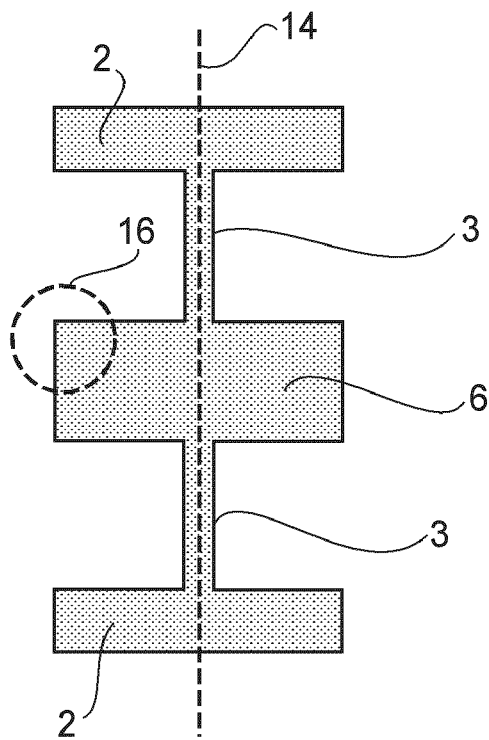
FIG.1
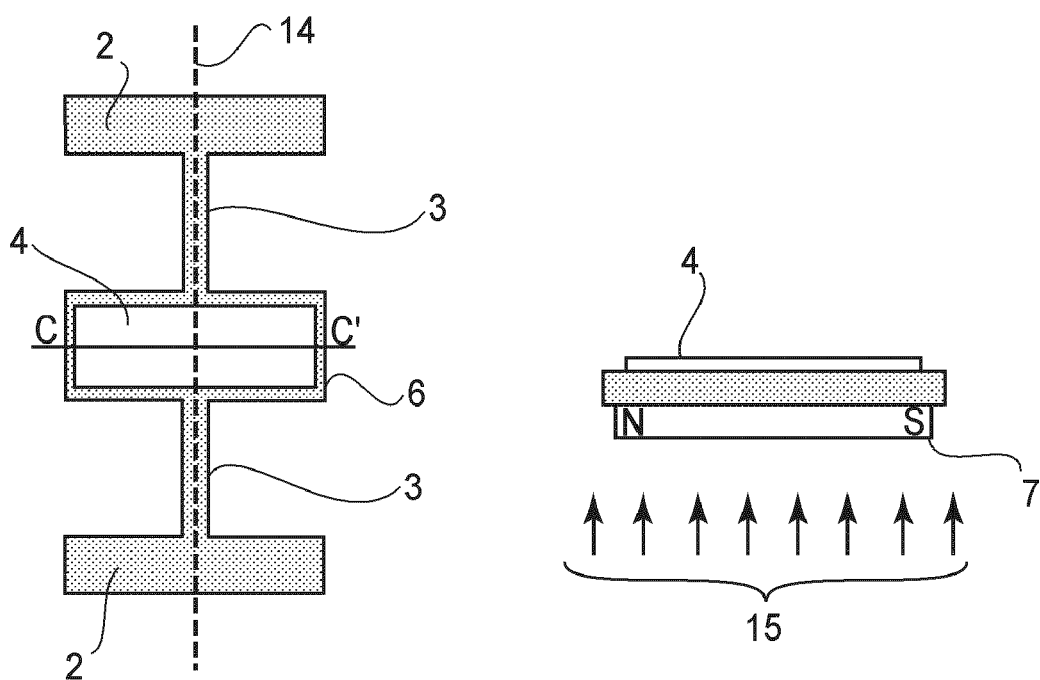
FIG.2A  FIG.2B

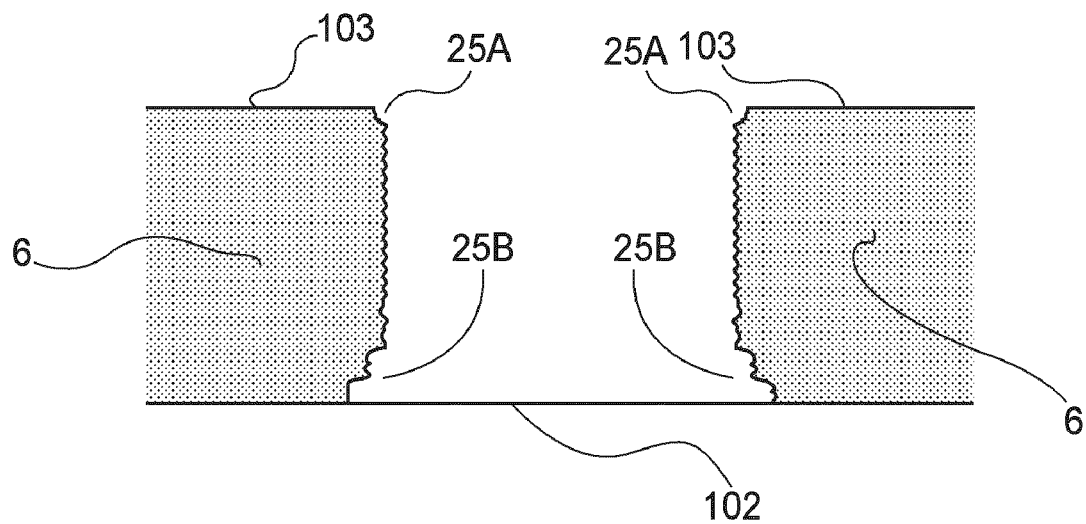
FIG.9
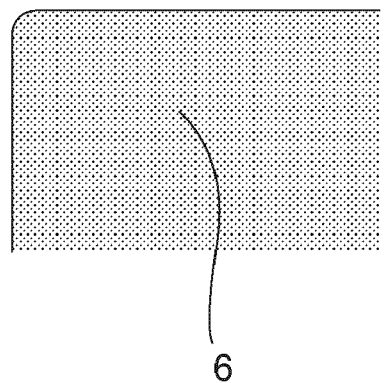 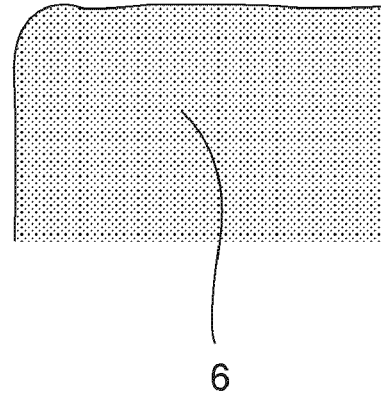
FIG.10A  FIG.10B

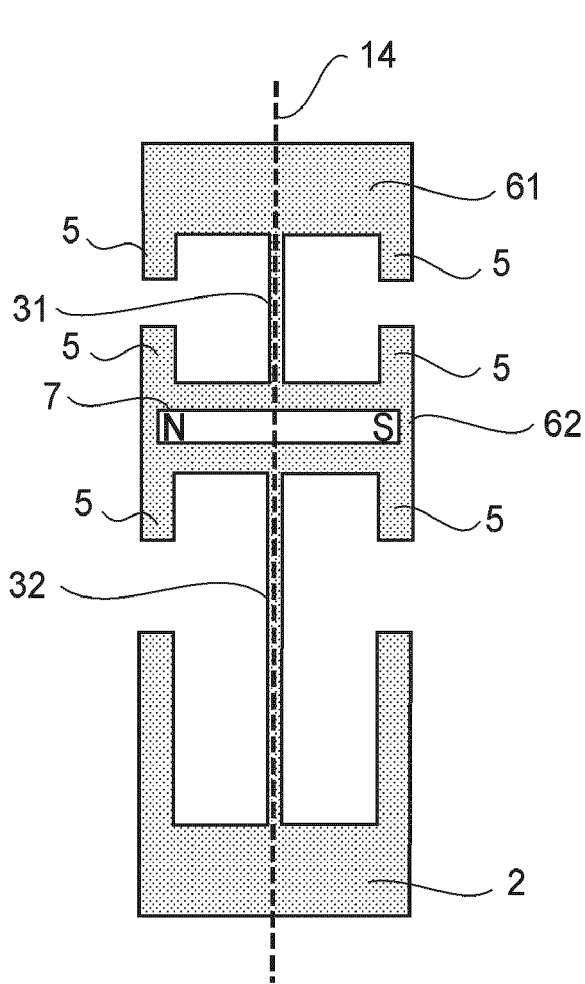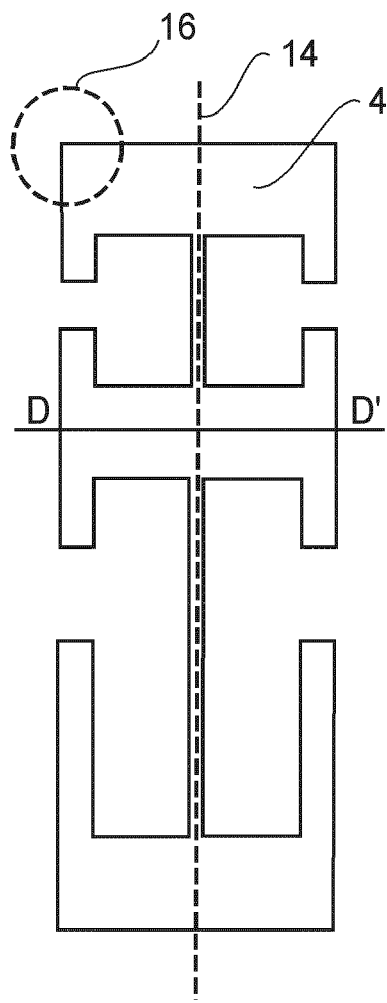
FIG.11A   FIG.11B
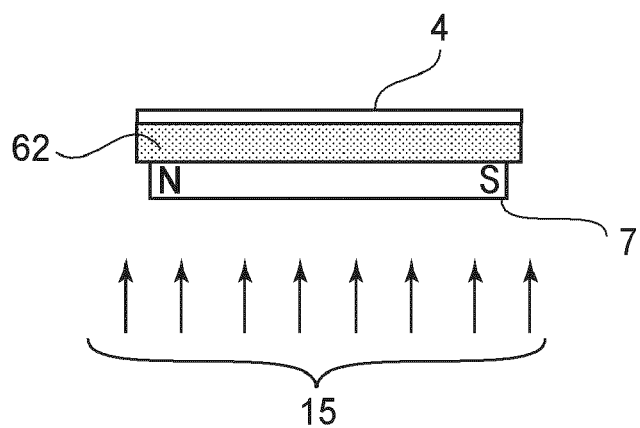
FIG.11C

METHOD OF MANUFACTURING OSCILLATOR DEVICE, AND OPTICAL DEFLECTOR AND OPTICAL INSTRUMENT HAVING OSCILLATOR DEVICE

FIELD OF THE INVENTION AND RELATED ART

This invention relates to a method of manufacturing an oscillator device having a movable member being elastically supported for torsional oscillation, and an optical deflector and an optical instrument which is comprised of an oscillator device produced in accordance with that manufacturing method.

Particularly, the oscillator device produced in accordance with the manufacturing method is usable in an optical deflector or an optical instrument such as an image forming apparatus, using that optical deflector.

For example, the present invention is preferably utilized in a projection display for projecting an image through the scanning deflection of light, or an image forming apparatus such as a laser beam printer or a digital copying machine having an electrophotographic process.

Minute machine members which are conventionally produced from a wafer by using a semiconductor process can be machined by micrometer order, and various minute functional devices are realized based on these.

Optical deflectors including an oscillator produced by such technique and having a reflection surface which is torsionally oscillated to perform optical scan, have the following advantageous features as compared with optical scanning optical systems using a rotary polygonal mirror such as a polygon mirror.

That is, the size of the optical deflector can be made small; and the power consumption is low.

Furthermore, if such an optical deflector is driven in the vicinity of the resonance frequency of the torsional oscillation of the oscillator, the power consumption can be made much lower.

Particularly, if an optical deflector based on an oscillator device mentioned above is to be used to constitute an image forming apparatus, an oscillator device having a large reflection area is required.

Conventionally, for manufacture of a minute machine member including an oscillator such as mentioned above, Japanese Laid-Open Patent Application No. 5-27193, for example, discloses a method of manufacturing it from a wafer based on the etching used in the semiconductor process.

Furthermore, U.S. patent application publication No. 2005/0141070 specification discloses use of anisotropic etching for that etching.

When the minute machine members are produced by using such etching process, the larger the number of products per a single wafer is, the cheaper the production cost of them is.

Furthermore, if a spring of a micro-oscillator is produced based on anisotropic etching of silicon using an alkali water solution, the spring surface which receives a large stress can be smoothed.

Thus, the stress concentration can be avoided by this smooth surface, and a micro-oscillator with a spring having good durability can be produced.

On the other hand, Japanese Laid-Open Patent Application No. 7-58345 discloses a technique of using a correction pattern when anisotropic etching is made to a monocrystal silicon substrate to produce a semiconductor acceleration sensor.

SUMMARY OF THE INVENTION

However, when an oscillator which is a minute machine member such as mentioned above is produced based on the etching process from a wafer, different etching masks are required to produce oscillators having different resonance frequencies.

This means that the etching mask manufacturing process has to be changed each time the resonance frequency necessary for the product is different. This makes the manufacturing process quite complicated and slows the efficiency.

Furthermore, if an optical deflector based on an oscillator device is used to constitute an image forming apparatus as described above, an oscillator device having large reflection area is required. Here, if a micro-oscillator is to be formed with a quadrangular reflection surface based on the etching, the following inconveniences will be caused.

When the micro-oscillator is formed with a quadrangular reflection surface by etching, since the vertexes of the reflection surface would be rounded, the effective reflection area will be decreased. Particularly, in the case of anisotropic etching, to avoid this, a technique of forming a correction pattern at a portion where a vertex is going to be formed, may be used (see Japanese Laid-Open Patent Application No. 7-58345). With this procedure, however, an extra pattern has to be used and, more seriously, even if such extra pattern is used, it is still difficult to form the vertex at a right angle.

If a large region is used for that reflection surface to meet these inconveniences, there would be a problem that the size of the device is enlarged.

Furthermore, since the vertex finishing error in the etching will cause an error of the inertia moment of the movable member, it necessarily leads to an increased manufacture dispersion of the resonance frequency.

The present invention provides a method of manufacturing an oscillator device by which micro-oscillators of different resonance frequencies can be manufactured by using the same etching mask and by which the decrease of the effective reflection area and the manufacture dispersion of the resonance frequency can be well suppressed.

Furthermore, the present invention provides an optical deflector and/or an optical instrument which is comprised of an oscillator device manufactured in accordance with that manufacturing method.

In accordance with an aspect of the present invention, there is provided a method of manufacturing an oscillator based on etching a monocrystal silicon substrate, the oscillator including a supporting base plate, a torsion spring and a movable member supported by the torsion spring for oscillatory motion around a torsional axis relative to the supporting base plate, and the oscillator having at least one resonance frequency around the torsional axis, said method comprising: a mask forming step for forming, on the monocrystal silicon substrate, an etching mask having a pattern with a repetition shape comprised of a plurality of mutually coupled oscillators each including the torsion spring between the supporting base plate and the movable member; an etching step for etching the monocrystal silicon substrate while using the etching mask as a mask, to form on the monocrystal silicon substrate a repetition shape comprised of a plurality of corresponding mutually coupled oscillators; and a dicing step for determining a width of the movable member and the supporting base plate of each of the oscillators in the repetition shape as formed at said etching step, which width is effective to determine a resonance frequency of the individual oscillators required when these are used as oscillators, and for cutting by dicing the movable member and the supporting base plate between adjoining oscillators, at the determined width.

In one preferred form of this aspect of the present invention, the method further comprises a separating step for cutting, after said dicing step, a region of the monocrystal silicon substrate where the plurality of oscillators are coupled together, to separate the oscillators into single pieces.

The etching step may perform the etching using a crystal anisotropy etching solution.

The method may further comprise a frequency adjusting member forming step for providing, after said dicing step, the movable member with an adjusting member configured to adjust the resonance frequency.

The method may further comprise a trimming step for adjusting, after said frequency adjusting member forming step, the resonance frequency by removing a portion of the frequency adjusting member.

In accordance with another aspect of the present invention, there is provided an optical deflector, comprising: an oscillator device manufactured in accordance with an oscillator device manufacturing method as recited above; and an optical deflecting element disposed on said oscillator of said oscillator device.

In accordance with a further aspect of the present invention, there is provided an optical instrument, comprising: a light source; a photosensitive member or an image display member; and an optical deflector as recited above; wherein said optical deflector is configured to deflect light from said light source so that at least a portion of the light is incident on said photosensitive member or said image display member.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a top plan view for explaining a micro-oscillator according to a first embodiment of the present invention.

FIGS. 2A and 2B are diagrams for explaining an optical deflector using a micro-oscillator according to the first embodiment of the present invention, wherein FIG. 2A is a top plan view illustrating an optical deflector of the first embodiment, and FIG. 2B is a C-C' sectional view of FIG. 2A, illustrating a movable member of the optical deflector of the first embodiment.

FIGS. 4A-4C are diagrams for explaining a mask forming step in the micro-oscillator manufacturing method of the first embodiment of the present invention, wherein FIG. 4A is a top plan view in the mask forming step, FIG. 4B is an A-A' sectional view of FIG. 4A in the mask forming step, and FIG. 4C is a B-B' sectional view of FIG. 4A in the mask forming step.

FIGS. 5A-5C are diagrams for explaining an etching step in the micro-oscillator manufacturing method of the first embodiment of the present invention, wherein FIG. 5A is a top plan view in the etching step, FIG. 5B is an A-A' sectional view of FIG. 5A in the etching step, and FIG. 5C is a B-B' sectional view of FIG. 5A in the etching step.

FIGS. 6A-6C are diagrams for explaining a dicing step in the micro-oscillator manufacturing method of the first embodiment of the present invention, wherein FIG. 6A is a top plan view in the dicing step, FIG. 6B is an A-A' sectional view of FIG. 6A in the dicing step, and FIG. 6C is a B-B' sectional view of FIG. 6A in the dicing step.

FIGS. 8A and 8B are diagrams for explaining the micro-oscillator manufacturing method of the first embodiment of the present invention, in comparison with the conventional example, wherein FIG. 8A is a top plan view of a silicon substrate after the etching step of the conventional example, and FIG. 8B is a top plan view illustrating a silicon substrate after the etching step of the present invention.

FIG. 9 is a Q-Q' sectional view of FIG. 8A, showing a movable member being disconnected after the etching step of the conventional example.

FIGS. 10A and 10B are diagrams showing the shape of a vertex of the movable member having an etching error occurred in the etching step of the conventional example, wherein FIG. 10A shows the surface where an etching mask has been formed, assuming the same location as the region depicted by a broken line in FIG. 1, and FIG. 10B is a top plan view of the movable member at the adhered surface side.

FIGS. 11A-11C are diagrams for explaining an optical deflector using a micro-oscillator according to a second embodiment of the present invention, wherein FIG. 11A is a top plan view illustrating an optical deflector of the second embodiment, FIG. 11B is a top plan view of the optical deflector of FIG. 11A as seen from the reflection surface side, and FIG. 11C is a D-D' sectional view of FIG. 11B illustrating a second movable member of the optical deflector of the second embodiment.

FIGS. 12A-12C are diagrams for explaining a mask forming step in the micro-oscillator manufacturing method of the second embodiment of the present invention, wherein FIG. 12A is a top plan view showing in an enlarged scale a portion of a silicon substrate 100, FIG. 12B is an E-E' sectional view of FIG. 12A, and FIG. 12C is a D-D' sectional view of FIG. 12A.

FIGS. 13A-13C are diagrams for explaining an etching step in the micro-oscillator manufacturing method of the second embodiment of the present invention, wherein FIG. 13A is a top plan view in the etching step, FIG. 13B is an E-E' sectional view of FIG. 13A in the etching step, and FIG. 13C is a D-D' sectional view of FIG. 13A in the etching step.

FIGS. 14A-14C are diagrams for explaining a dicing step in the micro-oscillator manufacturing method of the second embodiment of the present invention, wherein FIG. 14A is a top plan view in the dicing step, FIG. 14B is an E-E' sectional view of FIG. 14A in the dicing step, and FIG. 14C is a D-D' sectional view of FIG. 14A in the dicing step.

FIGS. 16A and 16B are diagrams for explaining a case based on a conventional etching step, wherein FIG. 16A is a top plan view for explaining a mask forming step in the conventional example, and FIG. 16B is a top plan view for explaining an etching step in the conventional example.

DESCRIPTION OF THE PREFERRED EMBODIMENTS

Figure 3:
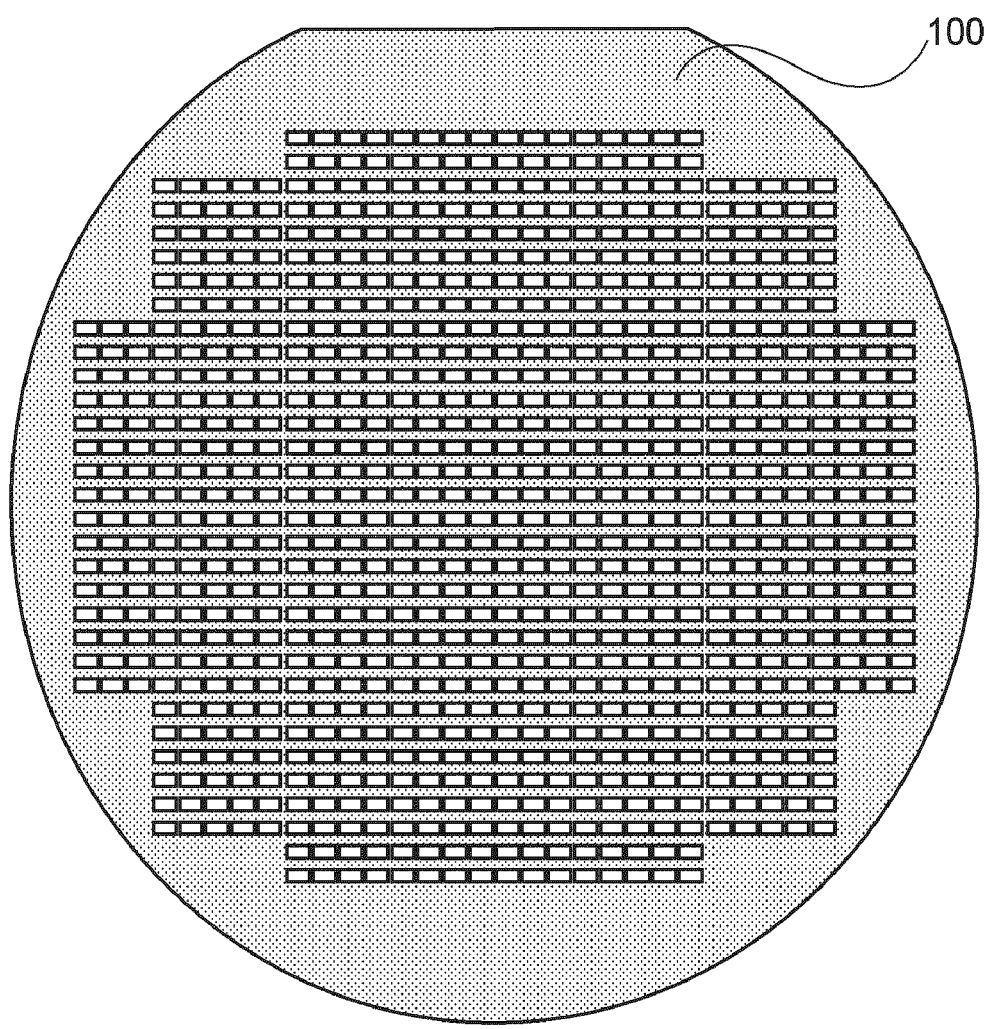
FIG. 3 is a top plan view of a silicon substrate to be used when a micro-oscillator in the first embodiment of the present invention is produced.

Preferred embodiments of the present invention will now be described with reference to the attached drawings.

Embodiment 1

A first embodiment of the present invention will be described with reference to a structural example of an oscillator manufacturing method wherein an etching is made to a monocrystal silicon substrate.

FIG. 1 illustrates a diagram for explaining a structural example of a micro-oscillator manufactured by the manufacturing method of the present embodiment.

FIGS. 2A and 2B are diagrams for explaining an optical deflector which is comprised of the micro-oscillator of the present embodiment, wherein FIG. 2A is a top plan view thereof and FIG. 2B is a C-C' sectional view of FIG. 2A illustrating the movable member thereof.

FIG. 3 through FIG. 7 are diagrams for explaining the micro-oscillator manufacturing method of this embodiment of the present invention.

Denoted in FIG. 1 at 2 are supporting base plates, and denoted at 3 are torsion springs. Denoted at 6 is a movable member, and denoted at 14 is a torsion axis. The portion denoted at 16 illustrates a region around a vertex of the movable member.

The present embodiment is arranged to provide a micro-oscillator comprised of a movable member 6 which is supported by torsion springs 3 for oscillatory motion around the torsion axis 14, relative to the supporting base plates 2 which are fixed. The movable member 6 has at least one resonance frequency around the torsion axis 14.

Here, the movable member 6 has a structure that it is supported by a pair of torsion springs to the supporting base plates 2.

The supporting base plates 2 which are at the opposite ends are fixed mechanically. The two torsion springs 3 which are in a pair are configured to elastically support the movable member 6 for torsional oscillation around the torsion axis 14. Thus, the resonance frequency of the torsional oscillation around the torsion axis 14 can be presented by the following equation (1).

$$f = 1/(2 \cdot \pi) \cdot \sqrt{(2 \cdot K/I)} \quad (1)$$

where K is the torsion spring constant of one torsion spring 3 around the torsion axis 14, and I is the inertia moment of the movable member 6 around the torsion axis 14.

A structural example of an optical deflector based on this micro-oscillator is shown in FIG. 2A. As shown in FIG. 2A, the movable member 6 has a reflection surface 4.

On the other hand, as shown in FIG. 2B, there is a permanent magnet 7 which is at a side remote from the side where the reflection surface 4 is formed, the permanent magnet being polarized in the direction as illustrated.

There is a driving means (not shown) which is configured to produce a magnetic field in a direction of the magnetic field direction 15 shown in FIG. 2B or in a direction opposite to it.

Here, the driving means drives the movable member 6 at a frequency approximately equal to the resonance frequency f. Therefore, power-saved driving is realized.

Next, referring to FIG. 3 through FIG. 7, a micro-oscillator manufacturing method of the present embodiment will be explained.

The micro-oscillator manufacturing method of the present embodiment provides a method by which micro-oscillators which are different in this resonance frequency f can be effectively manufactured.

Furthermore, regardless the etching process is used, the vertexes of the movable member 6 (one vertex is illustrated at a broken line 16, for example) can be precisely formed at a right angle. Therefore, the effective reflection area of the reflection surface 4 can be made large.

FIG. 3 is a top plan view of a silicon substrate 100 to be used when micro-oscillators of the present embodiment are produced.

As illustrated, using a silicon substrate which is generally used in the semiconductor production, a plurality of micro-oscillators can be manufactured upon a single piece of wafer.

Next, referring to FIG. 4A through FIG. 6C, the procedure in the manufacturing method of the present embodiment will be explained in the order of the steps to be carried out.

FIGS. 4A-4C through FIGS. 6A-6C are process diagrams illustrating manufacturing method of the present embodiment.

Figure 4A:
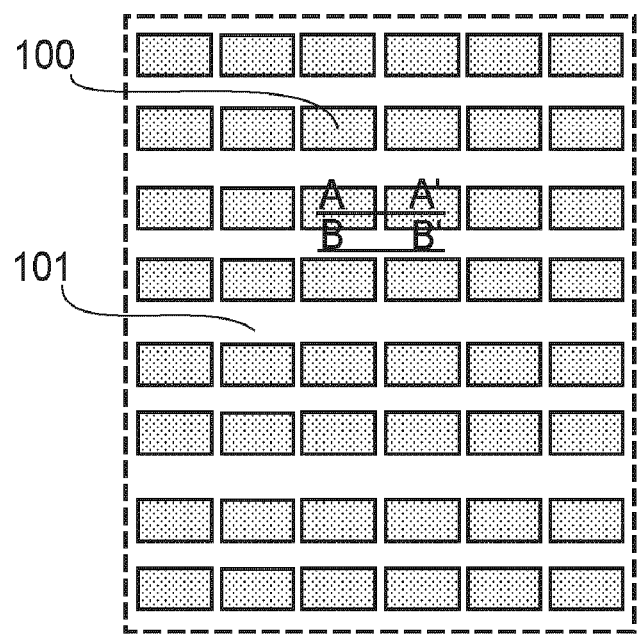
Figure 4B:
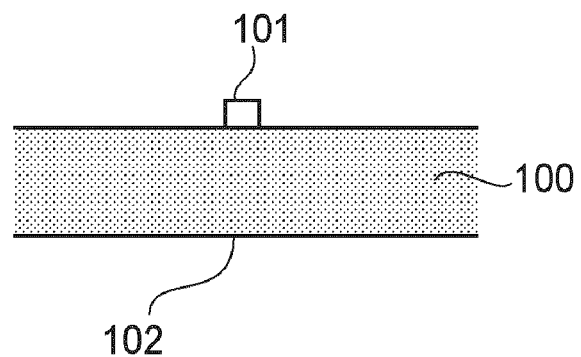
Figure 4C:
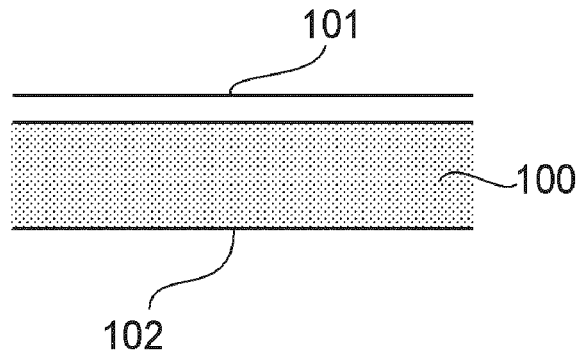

FIG. 4A is a top plan view in the mask forming step. FIG. 4B is an A-A' sectional view of FIG. 4A in the mask forming step. FIG. 4C is a B-B' sectional view of FIG. 4A in the mask forming step.

FIGS. 4A-4C are diagrams for explaining the mask forming step in the micro-oscillator manufacturing method of the present embodiment.

The mask forming step of the present embodiment is a process for forming an etching mask on a monocrystal silicon substrate, which etching mask has a pattern with a repetition shape comprised of a plurality of mutually coupled oscillators each including a torsion spring between a supporting base plate and a movable member as mentioned above.

More specifically, a silicon substrate 100 is adhered to a holding substrate (not shown), and an etching mask 101 is formed on the surface other than the adhered surface, as shown in FIG. 4A.

In this process, the etching mask 101 can be made by using a wide variety of materials in accordance with the thickness of the silicon substrate 100 which serves as a base material.

For example, the etching mask 101 can be made by vapor depositing aluminum and by patterning the aluminum using the photolithograph as shown in FIG. 4A.

With the mask forming step of the present embodiment, the etching mask can be made with a shape which is formed, as shown in FIG. 4B, along the contour of a material portion which will provide a torsion spring at a later step.

On the other hand, as shown in FIG. 4C, a material portion which is going to provide a movable member has a continuous shape as illustrated that extends over plural micro-oscillators to be produced as individual finished products.

The next step is an etching step by which the silicon substrate 100 is etched in the following manner.

Figure 5A:
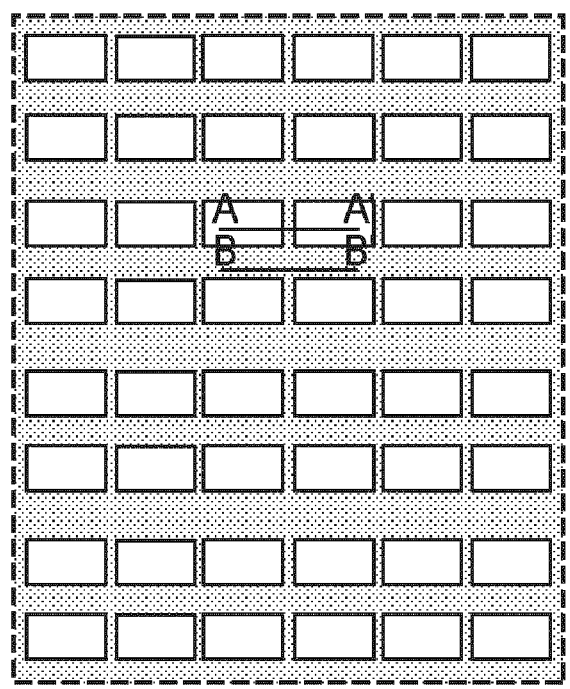
Figure 5B:
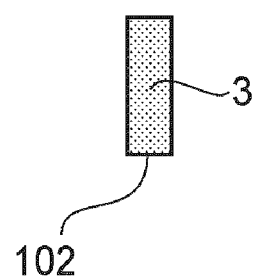
Figure 5C:
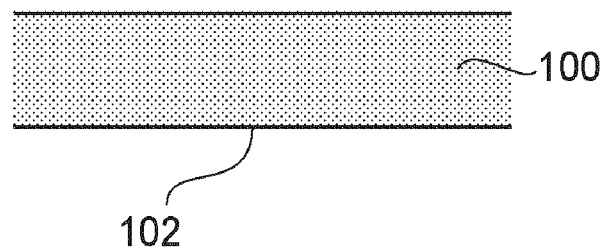

FIGS. 5A-5C illustrate the etching step in the micro-oscillator manufacturing method of the first embodiment of the present invention.

FIG. 5A is a top plan view in the etching step. FIG. 5B is an A-A' sectional view of FIG. 5A in the etching step. FIG. 5C is a B-B' sectional view of FIG. 5A in the etching step.

In the etching step of the present embodiment, the monocrystal silicon substrate is etched while the etching mask mentioned above is used as a mask, whereby a repetition shape comprised of a plurality of mutually coupled oscillators is formed on the monocrystal silicon substrate.

More specifically, as shown in FIGS. 5A, 5B and 5C, an etching hole which follows the contour of the etching mask 101 having been produced at the mask forming step of FIGS. 4A-4C is formed in the silicon substrate 100.

Here, since the silicon substrate 100 has been adhered to the holding substrate (not shown), the etching can be done so that the hole thoroughly extends through the silicon substrate 100. The etching process may use deep dry etching of silicon which is generally used.

Once the etching is finished, the etching mask 101 is removed.

In this manner, the torsion spring 3 is formed by this step, as shown in FIG. 5B.

The next step is a dicing step. First of all, the width of the movable member and the supporting base plate of the individual oscillators in the repetition shape as formed at the etching step, which width specifies the resonance frequency as required when these are used as individual oscillators, is determined. Then, the movable member and the supporting base plate are cut by dicing between adjoining oscillators, at the determined width.

More specifically, the silicon substrate 100 having torsion springs 3 formed thereon at the preceding etching step is cut in the following manner.

Figure 6A:
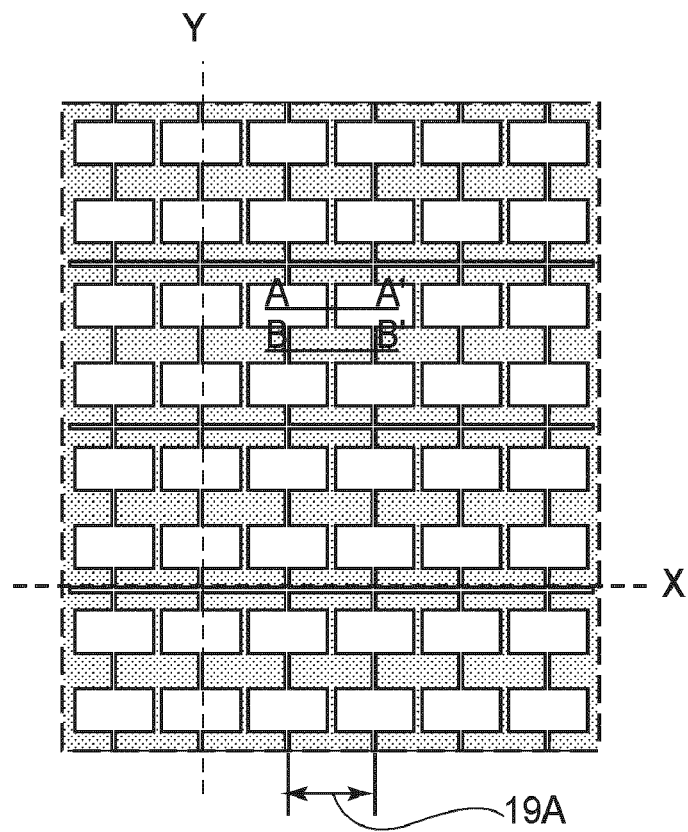
Figure 6B:
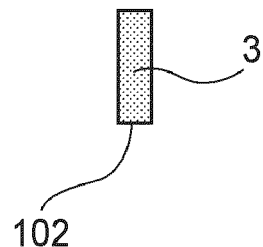
Figure 6C:
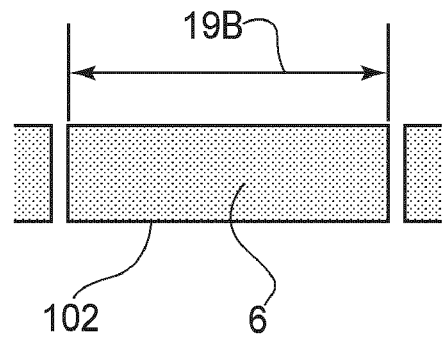

FIGS. 6A-6C are diagrams for explaining the dicing step in the micro-oscillator manufacturing method of the present embodiment.

FIG. 6A is a top plan view in the dicing step. FIG. 6B is an A-A' sectional view of FIG. 6A in the dicing step. FIG. 6C is a B-B' sectional view of FIG. 6A in the dicing step.

At the dicing step of the present embodiment, as shown in FIG. 6A, the silicon substrate 100 is cut in the Y-direction with a pitch of a width 19A.

This cutting step can be made using a dicing device or laser beam machining generally used to cut a silicon substrate.

If the etching mask 101 has been prepared while taking into account the cutting margin, movable members 6 having a width 19B can be produced at this step as shown in FIG. 6C.

In the following description, the term "width of the movable member" refers to the size perpendicular to the torsion axis, as shown at 19B in FIG. 6C.

The next step is a separating step after the dicing step. In this separating step, the region of the monocrystal silicon substrate where plural oscillators are mutually coupled is cut so that these oscillators are separated into individual pieces. In the separating step of the present embodiment, the supporting base plate on which a plurality of oscillators are connected is cut along a transverse direction as shown in FIG. 6A, into individual oscillators (namely, it is cut along the X-direction in FIG. 6A). In this separating step as well, a dicing device or a laser beam machining device can be used.

It should be noted that the separating step may be carried out before the dicing step. Namely, in the present embodiment, the supporting base plate connecting a plurality of oscillators may be cut in a transverse direction (X-direction) (separating step) and, afterwards, the silicon substrate 100 may be cut longitudinally (in Y-direction) at a pitch of the width 19A (dicing step).

Next, a method of manufacturing micro-oscillators having different resonance frequencies, based on the dicing step of the present embodiment, will be explained.

Figure 7:
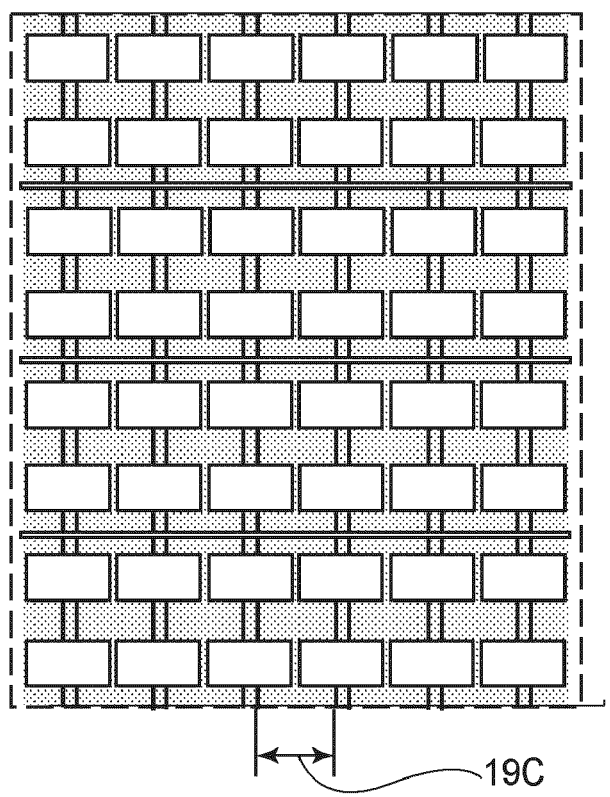
FIG. 7 is a top plan view for explaining a method to manufacturing micro-oscillators having different resonance frequencies, through the dicing step of the micro-oscillator manufacturing method of the present invention according to the first embodiment of the present invention.

FIG. 7 is a top plan view for explaining a method of manufacturing micro-oscillators of different resonance frequencies based on the dicing step of the present embodiment.

The state shown in FIG. 7 is that exactly the same procedure has been carried out up to the step shown in FIGS. 5A-5C and that only the cutting pitch at the dicing step is different from the one shown in FIG. 6A.

Using the dicing step of the present embodiment, as shown in FIG. 7 the silicon substrate 100 is cut at a pitch of a width 19C which is smaller than the pitch of the width 19A shown in FIG. 6A.

By this, micro-oscillators comprised of movable members based on the pitch of the width 19C which is smaller than the width shown in FIG. 6C can be produced.

The resonance frequency relates to the inertia moment I, as set forth in Equation (1) previously mentioned. Since the inertia moment I of the movable member 6 changes by approximately a cube of the size in the direction of the width 19B or 19C, by changing the width of the movable member, micro-oscillators having different resonance frequencies can be produced.

With the procedure of the present embodiment, as described above, not only micro-oscillators of different resonance frequencies can be produced using the same etching mask, but also the vertexes of each movable member can be formed precisely with a right-angle shape.

Namely, through the procedure of the present embodiment, the vertexes are not rounded as by the etching step of the previously described conventional example, but a precisely right-angle shape can be formed. Therefore, a large number of micro-oscillators having a wide reflection surface can be produced upon a single piece of silicon substrate 100.

Next, the procedure of the present embodiment will be explained in greater detail, in comparison with a conventional example.

Figure 8A:
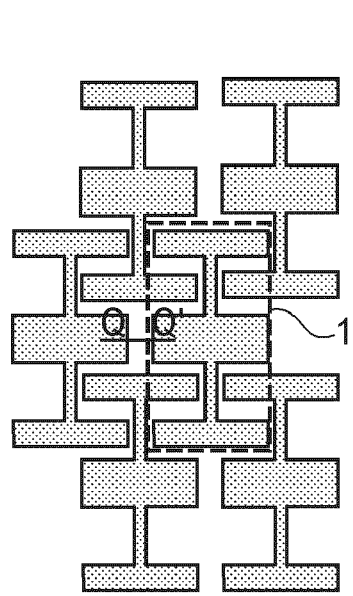
Figure 8B:
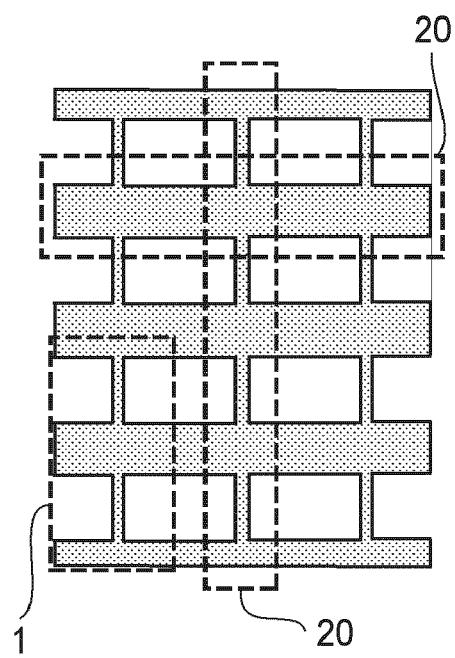

FIGS. 8A and 8B are diagrams for explaining the micro-oscillator manufacturing method of the present embodiment, in comparison with the conventional example. FIG. 8A is a top plan view of a silicon substrate having been processed by an etching step of the conventional example. FIG. 8B is a top plan view illustrating a silicon substrate having been processed by an etching step of the present invention.

FIG. 9 is a Q-Q' sectional view of FIG. 8A, illustrating separated movable elements having been processed by the etching step in the conventional example.

It is seen from FIG. 9 that the shape of the hole processed by the etching step shows a characteristic etching error. That is, as depicted by notches 25A and 25B, there are chips caused by the processing.

The notches 25A result from that the edge of the etching mask 101 is etched fast. The notches 25B are caused by the phenomenon that, during the penetration, the etching progresses laterally due to reflection of radicals or ions of etching at the adhered substrate surface.

FIGS. 10A and 10B illustrate the shape of a vertex of the movable member 6 which has an etching error caused by the etching step of the conventional example as described above.

FIG. 10A shows the surface portion similar to the region depicted by a broken line 16 in FIG. 1, where the etching mask has been formed. FIG. 10B is a top plan view of the movable member 6 at the adhered surface side thereof. It is seen from these drawings that the corners of the vertexes on the top surface side and the bottom surface side are rounded due to the presence of the notches 25A and 25B caused by the etching.

Particularly, as shown in FIG. 10B, the width at the adhered surface side is made small due to the notch 25B.

As described above, with the conventional etching step, the vertexes of the movable member 6 which provides a reflection surface are rounded and also the width is made smaller than that defined in the etching mask.

Thus, in order to form a desired reflection area, the etching mask must be formed with a lager size. This necessarily results in a decrease of the number of micro-oscillators which can be produced from a single piece of silicon substrate 100.

On the other hand, according to the manufacturing method of the present invention, when movable members 6 corresponding those shown in FIG. 9 are formed through the dicing step, a shape of a more accurately right angle than by the etching can be formed by this dicing step. As a result of this, rounding of the vertex can be prevented, and a larger number of micro-oscillators having a large reflection surface can be produced from a single piece of silicon substrate 100.

Furthermore, as shown in FIG. 8B, with the manufacturing method of the present embodiment, after the etching step there remain regions which will provide torsion springs and movable members of individual micro-oscillator, the regions being connected as a rib structure 20.

As a result of this, the whole silicon substrate has an increased intensity which effectively reduces the possibility of being broken. Furthermore, even if there is local intensity unevenness of the silicon substrate occurring at the adhesion with the holding substrate, because of the connection through the rib structure 20, the probability that some portion is peeled off to cause a defective is lowered, and thus the yield can be improved.

Embodiment 2

A second embodiment of the present invention will be described with reference to a structural example of an optical deflector which uses a micro-oscillator produced by a micro-oscillator manufacturing method to which an oscillator device manufacturing method of the present invention is applied.

FIGS. 11A-11C are diagrams for explaining an optical deflector using a micro-oscillator according to the second embodiment of the present invention.

FIG. 11A is a top plan view which illustrates an optical deflector of the present embodiment. FIG. 11B is a top plan view of the optical deflector shown in FIG. 11A, as seen from the reflection surface side thereof. FIG. 11C is a D-D' sectional view of FIG. 11B, illustrating a second movable member of the optical deflector of the present embodiment.

FIG. 12A through FIG. 15C are diagrams for explaining the micro-oscillator manufacturing method of this embodiment of the present invention.

In FIGS. 11A-11C, denoted at 2 is a supporting base plate, and denoted at 4 is a reflection surface. Denoted at 5 are adjustment members, and denoted at 7 is a permanent magnet. Denoted at 31 is a first torsion spring, and denoted at 32 is a second torsion spring. Denoted at 14 is a torsion axis. The reference numeral 16 depicts a region around a vertex of a first movable member. Denoted at 61 is the first movable member, and denoted at 62 is a second movable member.

The present embodiment is arranged to provide a micro-oscillator comprised of a first movable member 61 and a second movable element 62 which are supported by torsion springs 31 and 32 for oscillatory motion around the torsion axis 14, relative to the supporting base plate 2 which is fixed. The first and second movable members 61 and 62 have at least two resonance frequencies around the torsion axis 14.

Here, the first movable member 61 is supported by the second movable member 62 through a single piece of the first torsion spring 31, and the second movable member 62 is supported by the supporting base plate 2 through a single piece of the second torsion spring 32.

The supporting base plate 2 is fixed mechanically, and it supports the two movable members for torsional oscillation around the torsion axis 14. Thus, it provides two resonance frequencies of torsional oscillation relative to the torsion axis 14.

In the micro-oscillator of the present embodiment, the dimensions of the micro-oscillator are so designed that these two resonance frequencies have a relationship of 1:2.

Then, as shown in FIG. 11B, the first movable member 61 has a reflection surface 4 which is formed by aluminum.

On the other hand, as shown in FIGS. 11A and 11C, the second movable member 62 is provided with a permanent magnet 7 which is polarized in a direction as illustrated.

There is a driving means (not shown) which is configured to alternately produce a magnetic field in the direction of a magnetic field direction 15 shown in FIG. 11C or in the direction opposite to it.

Here, the driving means drives the micro-oscillator at two frequencies which approximately correspond to the two resonance frequencies. Therefore, once the amplitudes of these two frequencies which are excited simultaneously are set at an appropriate ratio, the first movable member 61 will be driven by a combined waveform of sinusoidal waves of a two-fold frequency relationship.

Thus, by reflecting the light from the light source with the reflection surface 4, superior optical scan of constant angular speed can be done over a wide angle as compared with a case where the scan is made by a sinusoidal wave.

Furthermore, the micro-oscillator of the present embodiment is provided with adjusting members 5.

These adjusting members 5 are formed as a cantilevered structure extending in parallel to the torsion axis 14, at locations on the first and second movable members 61 and 62, most apart from the torsion axis 14.

These adjusting members 5 are configured to independently adjust the inertia moments of the two movable members, by removing this portion using a method such as laser beam machining, for example. Since they are formed as a cantilevered structure, the heat during the machining or dusts created by the machining will less influence to the reflection surface 4.

Next, referring to FIG. 12A through FIG. 15C, the procedure in the manufacturing method of the present embodiment will be explained in the order of the steps to be carried out.

FIGS. 12A-12C through FIGS. 15A-15C are process diagrams illustrating manufacturing method of the present embodiment.

Figure 12A:
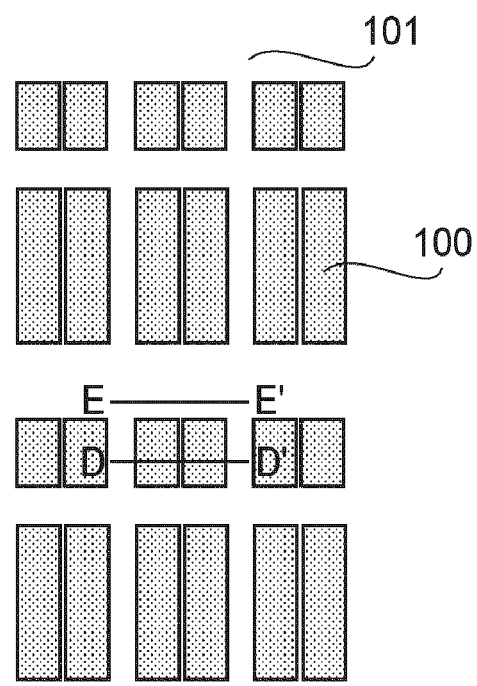
Figure 12B:
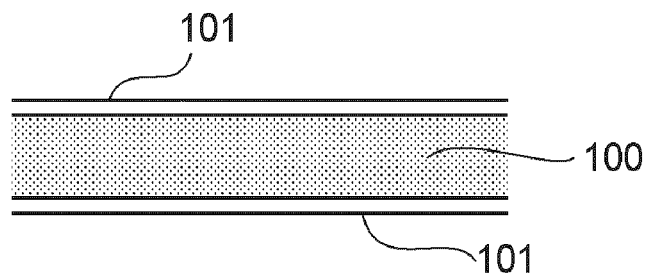
Figure 12C:
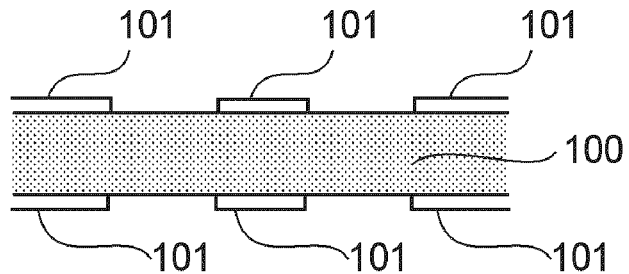

FIG. 12A is a top plan view showing a portion of a silicon substrate 100 in an enlarged scale. FIG. 12B is an E-E' sectional view of FIG. 12, and FIG. 12C is a D-D' sectional view of FIG. 12A. FIGS. 12A-12C are diagrams for explaining the mask forming step in the micro-oscillator manufacturing method of the present embodiment.

The mask forming step of the present embodiment is a process for forming etching masks 101 on the opposite surfaces of a silicon substrate 100 having a plane orientation in the (100) direction, as shown in FIG. 12A. The mask pattern of a rectangular shape shown in FIG. 12A has its respective sides formed in alignment with the <110> direction of the silicon substrate 100.

In this process, the etching mask 101 can be made by using a wide variety of materials in accordance with the type of the etching solution to be used in the subsequent etching step.

For example, as for the etching mask 101, a silicon nitride film may be formed by a chemical vapor phase synthetic method, and it may be patterned into an etching mask 101 as illustrated, using the photolithograph.

With the mask forming step of the present embodiment, as shown in FIG. 12B, continuous etching masks are formed at the material portion which will provide a first movable member 61 or a second movable member 62. On the other hand, as shown in FIG. 12C, at the material portion where a first torsion spring 31 and a second torsion spring 32 are to be formed, etching masks having the same structure are formed along the contour, on the top and bottom surfaces, respectively.

The next step is an etching step in which the silicon substrate 100 is etched in the following manner.

Figure 13A:
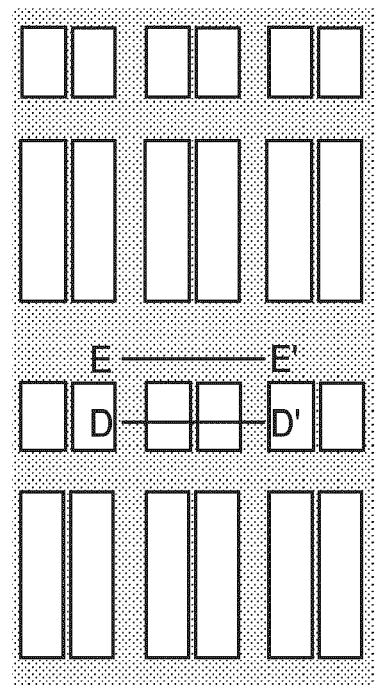
Figure 13B:
Figure 13C:
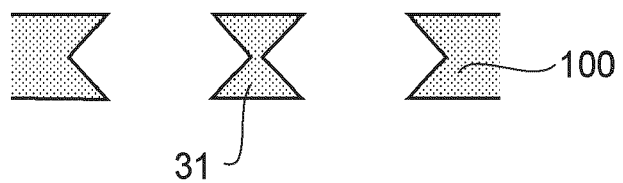

FIGS. 13A-13C illustrate the etching step in the micro-oscillator manufacturing method of the second embodiment of the present invention.

FIG. 13A is a top plan view in the etching step. FIG. 13B is an E-E' sectional view of FIG. 13A in the etching step. FIG. 13C is a D-D sectional view of FIG. 13A in the etching step.

In the etching step of the present embodiment, as shown in FIGS. 13A, 13B and 13C, an etching hole is formed in the silicon substrate 100 to follow the contour of the etching mask 101 having been prepared at the mask forming step of FIGS. 12A-12C.

Here, the silicon substrate 100 is etched from its both sides by a silicon crystal anisotropy etching solution. For example, a potassium hydroxide water solution is used in the present embodiment.

By using such crystal anisotropy etching solution, the section of the two torsion springs formed by etching can have a characteristic polygonal shape surrounded by (111) equivalence surfaces, as shown in FIG. 13C.

After the etching is finished, the etching mask 101 is removed. In this manner, the first torsion spring 31 and the second torsion spring 32 are formed at this step.

The next step is a dicing step in which the silicon substrate 100 having torsion spring 31 formed thereon by the aforementioned etching step is cut in the following manner.

Figure 14A:
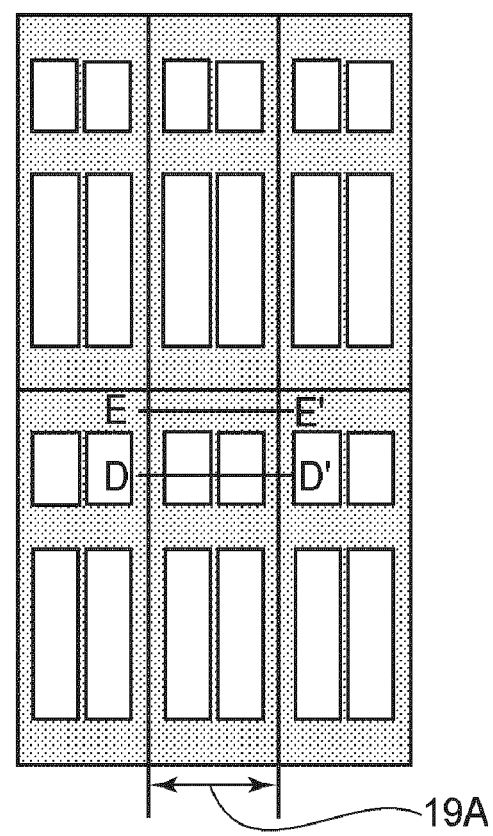
Figure 14B:
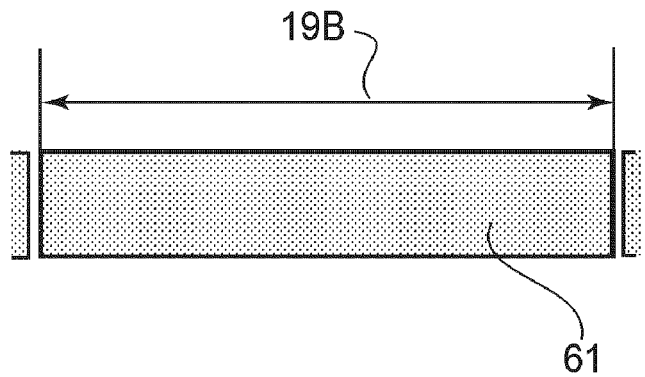
Figure 14C:
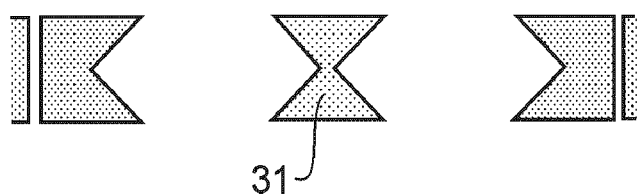

FIGS. 14A-14C are diagrams for explaining the dicing step in the micro-oscillator manufacturing method of the present embodiment.

FIG. 14A is a top plan view in the dicing step. FIG. 14B is an E-E' sectional view of FIG. 14A in the dicing step. FIG. 14C is a D-D' sectional view of FIG. 14A in the dicing step.

In the dicing step of the present embodiment, the silicon substrate 100 is cut at a pitch of a width 19A as shown in FIG. 14A.

This cutting step can be made using a dicing device or laser beam machining generally used to cut a silicon substrate.

If the etching mask 101 has been prepared while taking into account the cutting margin, the first and second movable members 61 and 62 having a width 19B can be produced at this step as shown in FIG. 14B.

With the manufacturing procedure of the present embodiment as well, movable members of different widths can be produced by changing the pitch of this dicing step, as shown in FIG. 7.

Thus, a micro-oscillator comprised of two movable members having different frequencies can be produced through the same mask forming step.

Figure 15A:
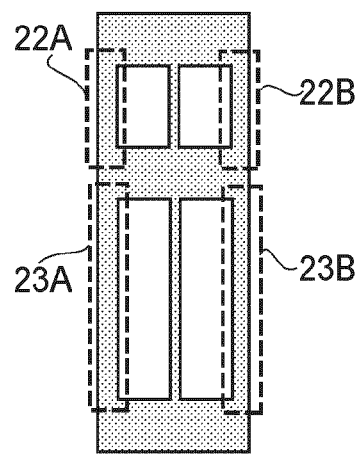
FIGS. 15A-15C are top plan views, respectively, for explaining a step of forming a frequency adjusting portion, in the micro-oscillator manufacturing method of the second embodiment of the present invention.
Figure 15B:
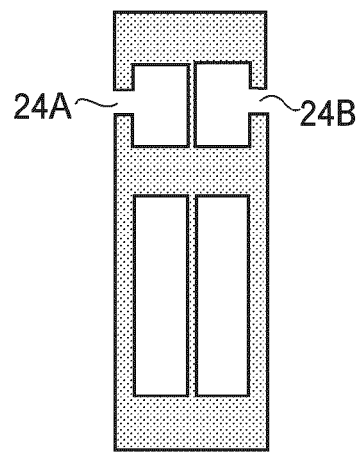
Figure 15C:
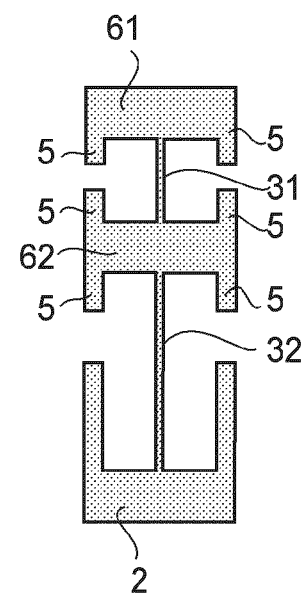

FIGS. 15A-15C are top plan views showing a process for forming the frequency adjusting members.

Through the dicing step of FIGS. 14A-14C, the micro-oscillator of the present embodiment is formed with a shape such as shown in FIG. 15A.

Here, the first movable member 61, the second movable member 62 and the supporting base plate 2 are coupled together by means of first joints 22A and 22B and second joints 23A and 23B.

Then, as shown in FIG. 15B, initially the first joints 22A and 22B are cut by using laser beam machining.

Here, the first movable member 61 is disconnected from the second movable member 62, so that it can torsionally oscillate.

Hence, in the state of FIG. 15B, the resonance frequency of a partial vibrator as formed by the first movable member 61 and the first torsion spring 31 can be examined. Thus, by adjusting the amount of removal of the cutting sections 24A and 24B based on it, the first movable member 61 can be made a desired value.

Furthermore, the second joint may be similarly cut by laser beam machining as shown in FIG. 15C, whereby a micro-oscillator of the present embodiment comprised of two movable members and two torsion springs, with adjusting members 5, can be produced.

Furthermore, the two resonance frequencies can be tuned to desired values by a trimming step to be described below.

First of all, the two resonance frequencies of the micro-oscillator are measured by sweeping the driving frequency of the driving means.

If the measured resonance frequency has an error with respect to a desired resonance frequency, a portion of the adjusting member 5 may be removed by using a laser, for example, to adjust the inertia moment. The resonance frequency can be tuned to a target value, with this adjustment.

Since the adjustment member 5 is formed as a cantilevered structure as described hereinbefore, the heat during the machining or dusts created by the machining will less influence to the reflection surface 4.

The micro-oscillator of the present embodiment as produced by the manufacturing method as described above uses a silicon crystal anisotropy etching solution in the etching step. As a result, the surface of the torsion spring can be well smoothed. Thus, concentration of the stress during the torsional oscillation can be avoided, and an oscillator having high reliability is accomplished. Therefore, when the same is used as an optical deflector, an optical deflector having a long life time is accomplished.

By the way, with the etching process of conventional example, the vertex portion of the movable member will be rounded by the etching. This will be explained below in detail.

Figure 16A:
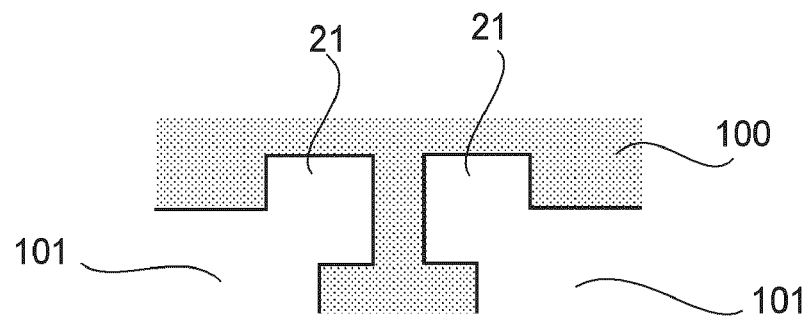
Figure 16B:
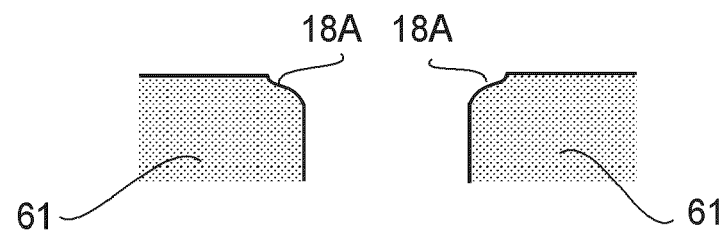

FIGS. 16A and 16B are diagrams for explaining a case using the etching process of conventional example.

FIG. 16A is a top plan view illustrating the mask forming step of conventional example, and FIG. 16G is a top plan view illustrating the etching step of conventional example.

Referring to FIG. 16A, an example of forming a vertex of a movable member such as depicted by a broken line 16 of FIG. 11B by use of a silicon crystal anisotropy etching solution in the conventional example, will be explained.

Here, FIG. 16A illustrates vertexes of two adjacent micro-oscillators, in the mask forming step. FIG. 16B illustrates the state of vertexes formed by the etching step using the etching mask of FIG. 16A.

It is seen from FIG. 16B that, with the conventional example, the vertex portions are rounded by the etching as depicted at 18A.

This results from that, in the silicon crystal anisotropy etching, the etching progresses fast in the vertex portion.

Therefore, it would be necessary to prepare correction patterns 21 such as shown in FIG. 16A, at portions where vertexes are to be formed.

However, even if such correction pattern 21 is used, it is still difficult to make the vertex precisely a right angle, and the vertex would be rounded as shown in FIG. 16B.

Figure 17A:
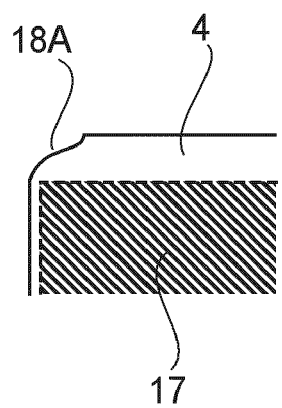
FIG. 17A is a top plan view for explaining the effective reflection area according to the conventional example.

If the reflection surface is formed using such a movable member, as shown in FIG. 17A the effective reflection area 17 to the whole area of the reflection surface 4 becomes quite small.

Figure 17B:
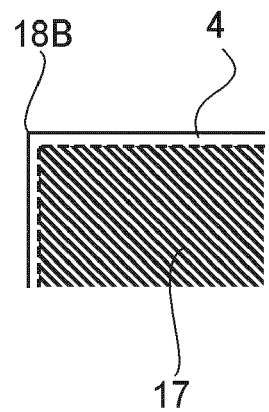
FIG. 17B is a top plan view for explaining the effective reflection area based on this embodiment of the present invention.

As compared therewith, according to the manufacturing method of the present embodiment, since the shape of the movable member is determined by the dicing step as shown in FIG. 17B, rounding of the vertex is avoided and the shape can be more precisely a right angle than what can be achieved by the etching. Thus, the effective reflection area 17 can be made large.

Furthermore, the conventional etching process requires use of a correction pattern 21 to form a vertex portion, as shown in FIGS. 16A and 16B. This causes inconveniences that individual micro-oscillators cannot be disposed close to each other and thus the number of micro-oscillators which can be produced from a single piece of silicon substrate is reduced.

Furthermore, in the etching mask of the correction pattern 21, since the silicon is etched at the end point of the etching process, only the etching mask has a cantilevered structure.

This easily causes a problem that the mask is broken to contaminate the etchant or it sticks to any other portion to create an etching error factor, resulting in the yield drop.

As compared therewith, according to the manufacturing method of the present embodiment, use of the correction pattern in the etching step is unnecessary, and the inconveniences caused the conventional example can be reduced.

Embodiment 3

The third embodiment will be described with reference to a structural example of an optical instrument using an optical deflector which is comprised of an oscillator device according to the present invention.

Here, and image forming apparatus is shown as an optical instrument.

Figure 18:
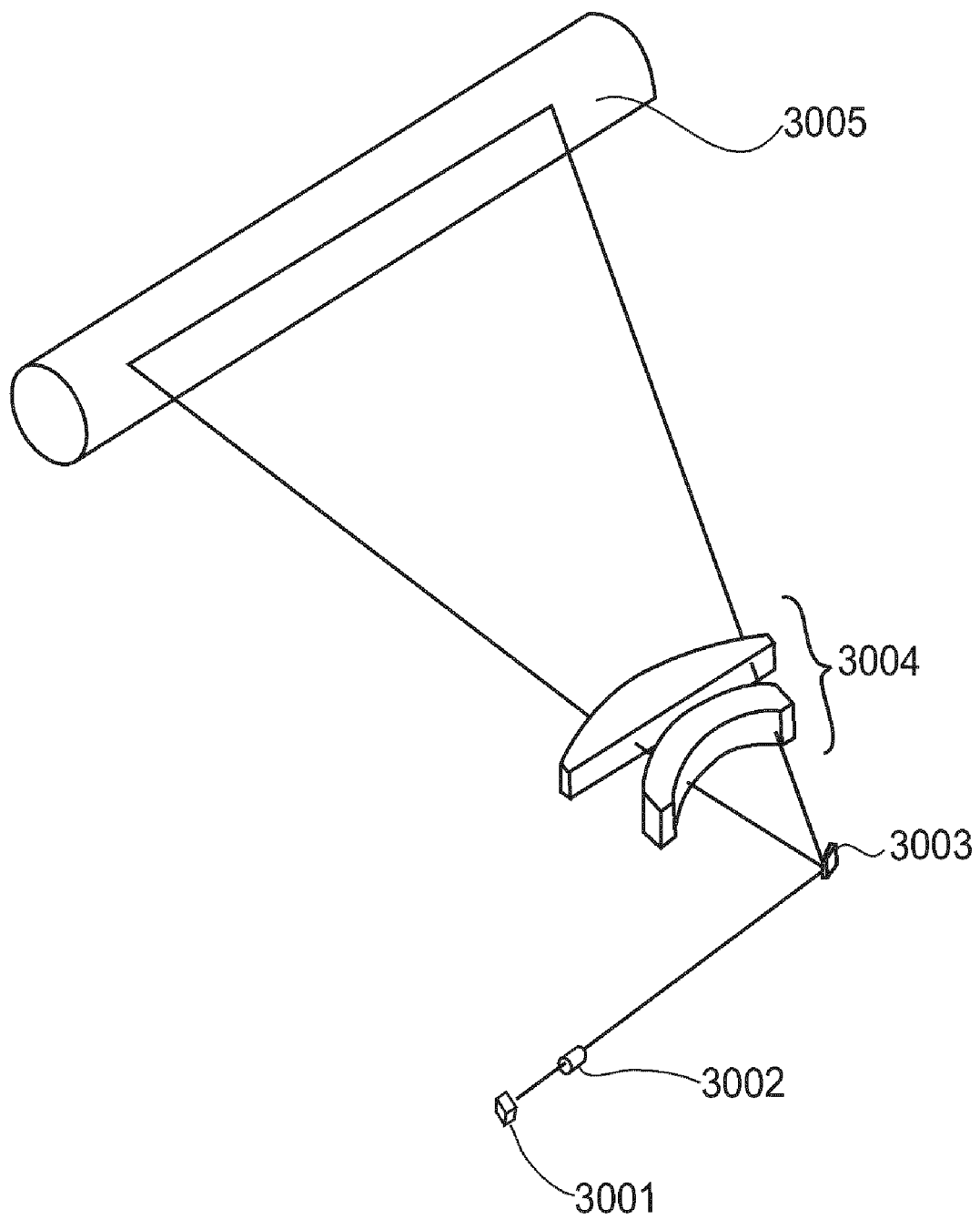
FIG. 18 is a perspective view for explaining a structure of an image forming apparatus according to a third embodiment of the present invention.

FIG. 18 is a schematic and perspective diagram for explaining the structural example of an image forming apparatus according to the present embodiment.

In FIG. 18, denoted at 3001 is a laser source, and denoted at 3002 is a lens or lens group. Denoted at 3003 is an optical defector comprised of an oscillator device of the present invention. Denoted at 3004 is a writing lens or lens group. Denoted at 3005 is a photosensitive member of drum shape.

The image forming apparatus of the present embodiment includes a light source, a photosensitive member and an optical deflector which has an optical deflecting element disposed on an oscillator and is comprised of an oscillator device of the present invention.

Light from the light source is deflected by the optical deflector, and at least a portion of the light is incident on the photosensitive member.

The laser beam projected from the laser source 3001 has received predetermined intensity modulation related to the timing of scanning deflection of the light. Specifically, as shown in FIG. 18, this intensity-modulated light goes through the lens or lens group 3002. Then, by means of the optical deflector 3003 which is comprised of an oscillator device according to any one of the preceding embodiments, the input light is one-dimensionally scanned.

Through the writing lens 3004, the scanning laser beam forms an image upon the photosensitive member 3005.

The photosensitive member 3005 which is rotated in a direction perpendicular to the scan direction and around a rotational axis, is being uniformly charged by a charging device (not shown) When the photosensitive member surface is scanned with light, an electrostatic latent image is formed on the portion scanned by the light.

Subsequently, a toner image is formed on the imagewise portion of the electrostatic latent image, by means of a developing device (not shown). The toner image is then transferred to and fixed on a paper sheet (not shown), whereby an image is produced on the paper sheet.

The image can be formed by using the optical deflector 3003 of the present invention, having a desired frequency.

Furthermore, with the optical deflector of this embodiment, the angular speed of the scanning deflection of the light can be made approximately constant within a specified range.

Furthermore, with the use of the optical deflector which is comprised of an oscillator device of the present invention, the drift of scan position is reduced, such that an image forming apparatus which can produce a sharp image is accomplished.

Although in the foregoing description the invention has been explained with reference to examples of image forming apparatus as an optical instrument, the present invention is not limited to such structure.

For example, it may include a light source, an image display member and an optical deflector which is comprised of an oscillator device of the present invention, and a projection display device may be constituted thereby, arranging so that light from the light source is deflected by the optical deflector and is incident on the image display member.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-301251 filed Nov. 21, 2007, for which is hereby incorporated by reference.

What is claimed is:

1. A method of manufacturing an oscillator based on etching a monocrystal silicon substrate, the oscillator including a supporting base plate, a torsion spring and a movable member supported by the torsion spring for oscillatory motion around a torsional axis relative to the supporting base plate, and the oscillator having at least one resonance frequency around the torsional axis, said method comprising:

a mask forming step for forming, on the monocrystal silicon substrate, an etching mask having a pattern with a repetition shape comprised of a plurality of mutually coupled oscillators each including the torsion spring between the supporting base plate and the movable member;

an etching step for etching the monocrystal silicon substrate while using the etching mask as a mask, to form on the monocrystal silicon substrate a repetition shape comprised of a plurality of corresponding mutually coupled oscillators; and a dicing step for determining a width of the movable member and the supporting base plate of each of the oscillators in the repetition shape as formed at said etching step, which width is effective to determine a resonance frequency of the individual oscillators required when these are used as oscillators, and for cutting by dicing the movable member and the supporting base plate between adjoining oscillators, at the determined width.

2. A method according to claim 1, further comprising a separating step for cutting, after said dicing step, a region of the monocrystal silicon substrate where the plurality of oscillators are coupled together, to separate the oscillators into single pieces.

3. A method according to claim 1, wherein said etching step performs the etching using a crystal anisotropy etching solution.

4. A method according to claim 1, further comprising a frequency adjusting member forming step for providing, after said dicing step, the movable member with an adjusting member configured to adjust the resonance frequency.

5. A method according to claim 4, further comprising a trimming step for adjusting, after said frequency adjusting member forming step, the resonance frequency by removing a portion of the frequency adjusting member.

6. An optical deflector, comprising:
an oscillator device manufactured in accordance with an oscillator device manufacturing method as recited in claim 1; and
an optical deflecting element disposed on said oscillator of said oscillator device.

7. An optical instrument, comprising:
a light source;
a photosensitive member or an image display member; and
an optical deflector as recited in claim 6;
wherein said optical deflector is configured to deflect light from said light source so that at least a portion of the light is incident on said photosensitive member or said image display member.

* * * * *